No. 808,739. PATENTED JAN. 2, 1906.
G. FOCHT.
STREET SWEEPER'S CART.
APPLICATION FILED FEB. 24, 1905.
2 SHEETS—SHEET 1.
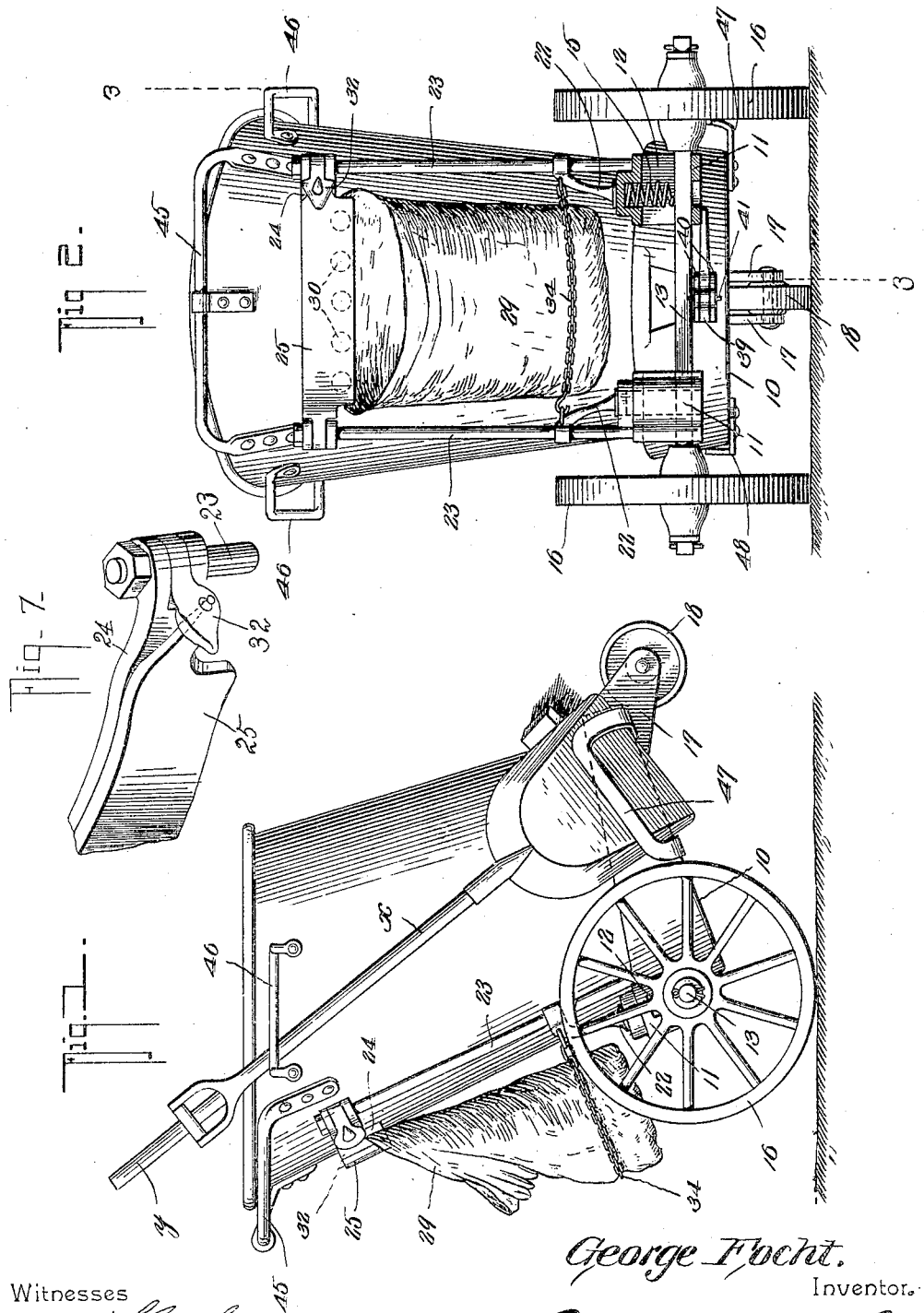
George Focht,
Inventor.
Witnesses
by
Attorneys

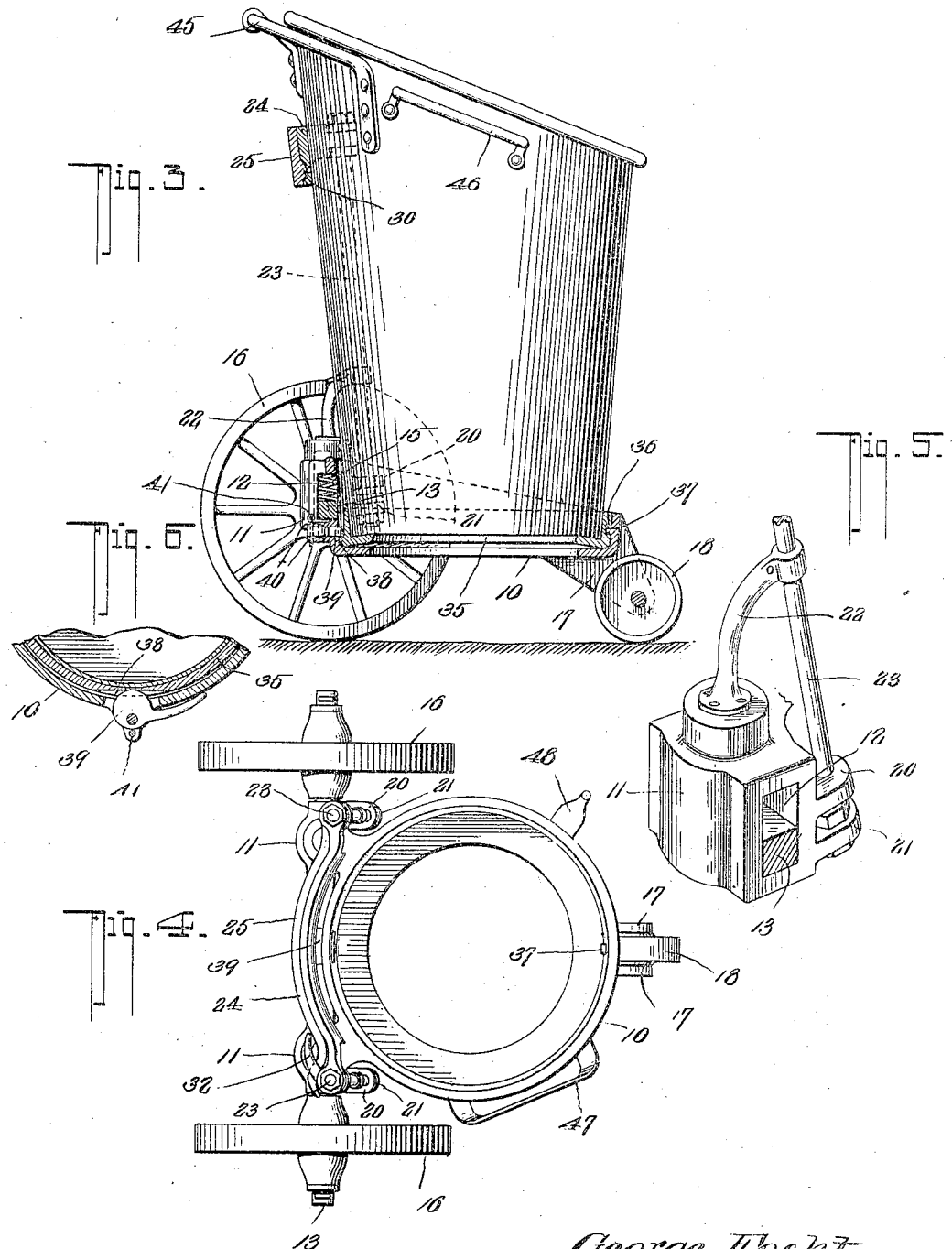

UNITED STATES PATENT OFFICE.

GEORGE FOCHT, OF HOBOKEN, NEW JERSEY.

STREET-SWEEPER'S CART.

No. 808,739.　　Specification of Letters Patent.　　Patented Jan. 2, 1906.

Application filed February 24, 1905. Serial No. 247,186.

*To all whom it may concern:*

Be it known that I, GEORGE FOCHT, a citizen of the United States, residing at Hoboken, in the county of Hudson and State of New Jersey, have invented a new and useful Street-Sweeper's Cart, of which the following is a specification.

This invention relates to a construction of carts and other small vehicles of that general class used by street-cleaners, and has for its principal object to provide a novel form of cart of strong but simple construction and provided with suitable means for the reception and support of receptacles for sweepings, trash, paper, and the like.

A further object of the invention is to provide a simple form of cart which may be readily handled in the transportation of filled receptacles, and, further, to provide means whereby a receptacle may be detachably connected to the cart and readily removed and replaced by another receptacle when filled.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a side elevation of a cart constructed in accordance with the invention, the front of the cart being tilted up to the angle generally assumed while the device is being moved. Fig. 2 is a rear elevation of the same, illustrating the cart in horizontal position with all of the wheels resting on the ground. Fig. 3 is a vertical section of the cart, the section being in the plane indicated by the line 3 3 of Fig. 2. Fig. 4 is a plan view of the cart with the receptacle removed. Fig. 5 is a detail perspective view of a portion of the frame. Fig. 6 is a sectional plan view of a portion of the mechanism for securing the receptacle in position on the cart. Fig. 7 is a detail perspective view of a catch for holding the bag-clamp in position.

Similar numerals of reference are employed to indicate corresponding parts throughout the several figures of the drawings.

The platform or body portion of the cart includes an annular flange 10, formed of cast or other metal and generally in the form of an angle-bar in cross-section, the vertical web at the front of the cart being considerably less in height than the corresponding web at the rear end thereof. Secured to or formed integral with the rear portion of the flange are two axle-boxes 11, each of which is provided with a vertical slot 12 for the reception of a transversely-extending axle 13, which in the present instance is of rectangular contour in cross-section and fits snugly within the vertical slots. Between the top of the axle and the upper walls of the slots are arranged helical compression-springs 15, which support the platform and the receptacle or receptacles carried thereby, so that said platform is free to yield vertically when the cart is traveling over an uneven road. The opposite ends of the axle are provided with wheels 16 of any desired character, and at the front of the ring is arranged a pair of brackets 17, between which is pivoted a small roller or wheel 18, which comes into play when the device reaches the field of operations. At each side of the frame is arranged a pair of lugs 20 21, and these in connection with brackets 22 serve as supports for slightly-inclined bars or rods 23, that are connected at their upper ends by a transverse bar 24, the latter being curved to follow the contour of the dirt-receptacle carried by the cart and forming in connection with a second bar 25 a clamp for the reception of a bag or similar receptacle 29, into which waste paper and the like may be placed. One of the clamp-bars is provided with a plurality of sockets and the other with rounded lugs 30, which when entered in the sockets serve to firmly hold the bag in place. One end of the bar 25 is pivoted to the upper portion of one of the inclined bars 23, and its opposite end is provided with a projecting finger that is arranged to enter an opening formed in a catch 32, that is pivoted to the opposite inclined bar, and after the bag has been placed in position the clamp-bar 25 is moved to closed position, and the catch 32 serves to prevent accidental release of the bag. In order to prevent swaying of the bag, a chain or similar support 34 is secured between the two brackets 22 and passes to the rear of the bag.

The ring 10 serves as a support for a sweepings-receptacle, that shown in the present instance being in the form of a sheet-iron vessel tapering slightly from top to bottom and provided at its lower end with a strengthening-ring 35, in the front of which is a recess 36 for the reception of a lug 37, that extends inwardly from the ring 10. The rear surface of the ring is recessed, forming a shoulder 38, with which engages an eccentrically-mounted locking-lever 39, that is pivoted between two lugs or ears 40, forming a part of the ring 10, and said ears are provided with vertically-alined openings for the passage of a locking-pin 41, which by engagement with the rear face of the locking-lever will retain the latter in locking position. The receptacle is thus rigidly locked to the frame and accidental displacement is prevented.

To the upper portion of the rear face of the receptacle is secured a handle-bar 45, arranged within convenient reach of the workmen and forming a convenient means for propelling the cart, the latter being tilted to the position shown in Fig. 1 while being moved from place to place and the weight of the cart and its contents being yieldably supported by the springs 15. At the opposite sides of the dirt-receptacle are arranged handles 46, that are designed principally for the convenient removal of filled receptacles and also serve as partial supports for the tools of the workman, these being usually in the form of a shovel $x$ and broom $y$, the lower end of the shovel being supported by a looped bracket or strip 47, that is secured to the ring 10, while the broom is supported by a bracket 48, also secured to said ring.

The upper edge of the bucket is disposed at an oblique angle to the vertical axis of said bucket, the front edge being lowermost, so that when the apparatus is in the position shown in Fig. 3 the dirt or other refuse may be readily shoveled thereinto, the raised back portion forming a guard for preventing accidental spilling of the refuse during the shoveling operation and while the cart is tilted to the position shown in Fig. 1 during transportation from place to place.

It will be noted that when a receptacle is in position on the cart the handle 45 of the receptacle may be grasped by the operator in moving the same from place to place; but other forms of receptacles may be used, and the clamping-bars 24 and 25 may, if necessary, constitute the handle. The inner clamp-bar 24 serves, moreover, as an additional means for preventing accidental displacement of the receptacle, the bar being curved to conform to the contour of the receptacle and serving as a rest when the device is tilted to the position shown in Fig. 1.

Having thus described the invention, what is claimed is—

1. A wheeled frame having upper and lower spaced supports for a main receptacle, the upper support being arranged to partly encircle the rear portion of said receptacle, and a clamping means curved to conform to said upper support and coacting therewith to hold an auxiliary receptacle.

2. A wheeled frame having a plurality of spaced supports for a main receptacle, one of said supports constituting a bag-clamping bar, and a second bar coacting therewith, said bars being provided with interfitting projections and recesses for engagement with a bag.

3. The combination with a wheeled frame arranged for the reception of a main receptacle, of an elevated bar supported by the frame and shaped to conform to the contour of the receptacle, and a second clamping-bar coacting therewith, the bars being provided with interfitting projections and recesses for engagement with a bag.

4. A cart having a flanged frame for the support of a receptacle, and a receptacle-locking means carried by the flange of said frame and engaging the lower portion of the receptacle.

5. The combination with a frame including an annular flange arranged for the reception of a receptacle, locking devices carried by said annular flange, an auxiliary receptacle-support arranged in a plane above the flange, and a pivotally-mounted clamping-bar serving in connection with said auxiliary support to clamp and hold the bag.

6. In apparatus of the class described, the combination with a wheeled frame including an annular flange arranged for the support of a receptacle, receptacle-locking devices at the front and rear of said flange, axle-boxes formed integral with the flange and provided with axle-receiving slots, axles extending through said slots, springs arranged within the boxes and bearing on the axle, wheels carried by the axle, inclined bars extending upward from points adjacent to the axle-boxes, a combined clamping and supporting bar carried by the upper ends of said bars, an auxiliary clamping member pivoted to one of said bars and coacting with said clamping and supporting bar to engage with and hold the bag.

7. In a device of the class specified, a wheeled frame, a detachable receptacle carried thereby, means for interlocking the frame and receptacle, and an operating-handle rigidly secured to and extending rearward from the receptacle to permit tilting of the wheeled frame and receptacle, and for propelling and guiding the same, the handle serving, also, as a means for manipulating the receptacle when the latter is detached.

In testimony that I claim the foregoing as my own I have hereto affixed my signature in the presence of two witnesses.

GEORGE FOCHT.

Witnesses:
   WM. R. STANTON,
   EDW. F. BRIGGS.